Figures 1, 2:
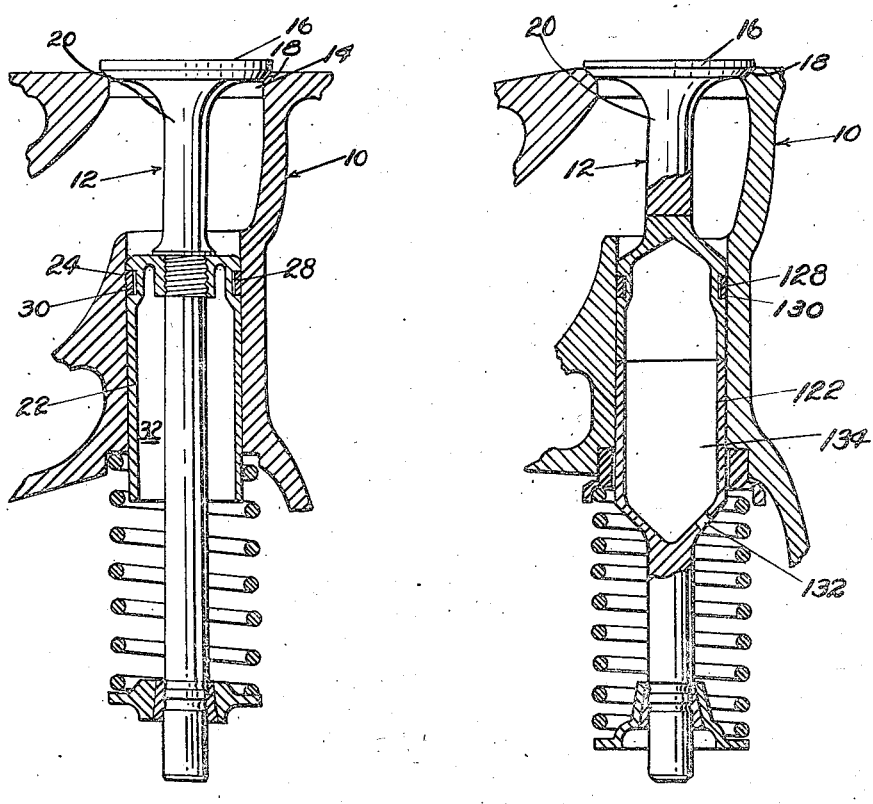

Feb. 11, 1947.　　　C. VOORHIES　　　2,415,774
VALVE
Filed July 29, 1944

INVENTOR.
CARL VOORHIES
BY
　Joseph P. Teagno
　　ATTORNEY

Patented Feb. 11, 1947

2,415,774

UNITED STATES PATENT OFFICE 2,415,774

VALVE

Carl Voorhies, Birmingham, Mich., assignor to Eaton Manufacturing Company, Cleveland, Ohio, a corporation of Ohio Application July 29, 1944, Serial No. 547,183

6 Claims. (Cl. 123—188)

This invention relates to poppet valves for internal combustion engines and more particularly to a novel construction thereof.

Broadly the invention comprehends the provision of an internal combustion engine poppet valve having means incorporated therein providing for valve cooling, prevention of seepage of excess lubricant past the top of the valve guide, and removal of carbon from the valve guide.

It is well known that during the operation of internal combustion engines considerable valve trouble arises from the fact that carbon and other foreign material collects on the valve stem and guide particularly on and adjacent that portion of the valve stem which operates in the upper end of the valve guide. These deposits have a tendency to cause the valve to stick with the result that the valves overheat and burn and ultimately fail. Furthermore, oil or other lubricant that is provided for lubricating the valve stem tends to work its way up the valve stem and past the top of the valve guide such that it comes in contact with the hot surface of the valve thereby forming additional carbon deposits on the upper portion of the valve stem. Because of this the lubricant consumption is high due to the wasteful volatilization thereof upon the heated valve portions not requiring lubrication. Means have been previously devised for retarding carbon formation, removing carbon deposited on the valve guide, and inhibiting lubricant from coming in contact with the valve stem so that it will not be conveyed up the valve stem past the valve guide, but such devices have not proved entirely satisfactory.

The instant invention provides for the incorporation within the valve of means sufficiently capable of alleviating the present resultant conditions the valve must operate under.

An object of the invention is the provision of a poppet valve for internal combustion engines having a hollow piston-like stem providing an enlarged bearing surface and effective cooling means to quickly dissipate the heat from the valve head.

Another object of the invention is the provision of a poppet valve for internal combustion engines having an enlarged hollow piston-like stem, said stem having an oil ring adjacent one end thereof.

Another object of the invention is the provision of a poppet valve having means incorporated in the stem thereof providing for cooling of the valve head and stem, removal of carbon from the valve guide, and prevention of seepage of valve stem lubricant past the top of the valve guide.

Another object of the invention is the provision of a poppet valve for internal combustion engines having an enlarged hollow piston-like section intermediate its length, said piston-like section having openings in the base thereof providing communication with the interior of the hollow piston-like section for the admission of a cooling agent thereinto.

A further object of the invention is the provision of a poppet valve for internal combustion engines having a cylindrical skirt and guide such that a cooling agent may be received between the cylindrical skirt of the valve and its guide to thereby effectively cool the valve head and skirt.

A still further object of the invention is the provision of a poppet valve for internal combustion engines having a mushroom shaped head; a stem, a portion of the stem being in the form of a cylindrical skirt; and an oil ring mounted in an annular groove in the skirt whereby the skirt and oil ring provide effective valve cooling, valve stem lubrication, and carbon removal from the valve guide within which the skirt is adapted to reciprocate.

And yet, a further object of the invention is the provision of a valve for internal combustion engines having a mushroom shaped head and a valve stem integral therewith, said stem having a hollow piston-like skirt integral therewith and intermediate its length whereby the valve may be effectively cooled through the circulation of oil internally of the hollow piston-like skirt.

And yet, a still further object of the invention is the provision of a poppet valve for internal combustion engines having a hollow piston-like body, said body having an oil ring adjacent the head thereof whereby the body is received by the valve guide and is adapted to support the valve in its reciprocation; the ring acting to inhibit passage of excessive oil or the like past the top of the valve guide as well as effectively scrape accumulative carbon from the top of the guide, the body being adapted to receive a cooling agent for the purpose of cooling, primarily, the valve stem and the valve head generally.

Other objects and advantages of the invention will appear from the following description taken in connection with the drawing, forming a part of the specification; and in which:

Figure 1 is a partial sectional view of an internal combustion engine embodying the preferred type of valve; and Figure 2 is a partial sectional view of an internal combustion engine embodying a modified form of valve.

It is the general practice in the construction of poppet valves for internal combustion engines to provide means for effectively cooling the head, stem, and seat thereof so as to reduce the tendency of heated exhaust gases generated in the cylinder head of the engines to pit the head and seat of the valve.

Furthermore means have been devised in association with the valve stem to retard if not entirely inhibit the collection and accumulation of carbon deposits on the upper portion of the valve guide as well as allow for proper lubrication of the valve stem.

The present invention is aimed at accomplishing the aforesaid in a more positive and effective manner through the provision of a novel valve construction. This valve has a piston-like body constituting a portion of the valve stem, said body having an oil ring adjacent one end of the body for the purpose of inhibiting seepage of oil past the valve guide in which it is supported and also adapted to scrape away any deposit of carbon from the top of the valve guide. The diameter of the body is made considerably larger than the remainder of the valve stem so as to provide a large cooling surface such that the external area of the piston-like body in association with the oil ring will provide for a continuous oil film of large area between the valve body and valve guide with the result that good thermoconductivity will exist therebetween to carry away the heat from the valve stem. With a rapid dissipation of the heat from the valve head and stem, the heat flow from the head and seat of the valve is increased with the consequent overall cooling of the valve and a less likely formation of carbon deposits on the valve and valve guide. Because of the effective cooling of the valve and valve stem, the tolerances between the valve body and valve guide can be held very close with the result that the valve can be closely guided, thereby minimizing usual valve operational noise.

Referring to the drawing for more specific details of the invention, reference being had to Figure 1, 10 represents generally an engine block and 12 a valve in operational position in the engine block for controlling port 14 of a cylinder of the engine. The valve 12 may be an exhaust valve in which case port 14 would be an exhaust port, although the invention may also be applied to intake valves.

The valve 12 comprises a head 16, which cooperates with an annular seat 18 in the engine block for controlling port 14, and a stem 20. The stem 20 has threaded or otherwise suitably secured thereto a concentric skirt or piston 22 which is adapted for reciprocable sliding movement in a valve guide 24 comprising part of the engine block. The skirt has adjacent the top of the valve guide an external annular groove 28 for the reception of an oil ring 30 and provides in conjunction with the stem of the valve a chamber 32 which is adapted to receive oil or other cooling fluid. The oil ring 30 acts to inhibit seepage of excessive oil past the top of the valve guide and also scrape away any carbon deposit that may become deposited on the upper portion of the valve guide thereby preventing sticking of the valve in the guide.

Oil or other like fluid that may be used for lubricating purposes may be supplied to the chamber 32 and the space between the external surface of skirt 22 and the valve guide from the crank case of the engine or other suitable source for the purpose of cooling the valve stem and also provide lubrication between the guide and skirt. The oil film formed between the skirt and guide will also assist in the cooling of the valve because of its thermoconductivity properties thereby conveying the heat away from the valve to and through the valve guide. With the general overall cooling of the valve stem the valve head may be more readily cooled by the dissipation of heat therefrom through the valve stem.

A modification of the invention as shown by Figure 2 differs from the preferred embodiment of the invention only in that the valve is shown as having a hollow piston-like body 122 integral with and forming a portion of the stem of the valve. The valve body 122 has an annular groove 128 for the reception of an oil ring 130 similar to 28—30 of the preferred embodiment of invention and openings 132 communicating with the chamber 134 in the piston. The openings 132 provide for access of fluid to the chamber 134 for the cooling of the valve body 122 and the valve generally.

While this invention has been described in connection with certain specific embodiments, the principle involved is susceptible of numerous other applications that will readily occur to persons skilled in the art. The invention is, therefore, limited only as indicated by the scope of the appended claims.

What I claim is:

1. A poppet valve for internal combustion engines comprising a solid mushroom shaped head and a stem integral therewith, a portion of said stem axially spaced from the head being enlarged in the form of a hollow open end piston, said piston-like portion having an oil ring in its outer periphery.

2. A poppet valve for internal combustion engines comprising a head and a stem, said stem at a point axially disposed from the head having an enlarged concentric skirt integral therewith adapted to support the valve for operational reciprocation and combined fluid sealing and carbon scraper means incorporated in the outer periphery of the skirt.

3. A poppet valve for internal combustion engines having a head and a stem, a portion of said stem being in the form of a hollow piston greater in diameter than the remainder of the stem encompassing said stem proper and opened at one end removed from the top of the valve, said piston-like portion of the stem having an external oil ring incorporated therein.

4. A poppet valve for internal combustion engines comprising a mushroom shaped head and a stem, said stem having an enlarged concentric skirt extending downwardly from a point near the head of the valve surrounding a substantial portion of the stem proper adapted to provide an open chamber.

5. A poppet valve having a head and a stem, said stem comprising a central portion and a concentric skirt portion adapted to support the valve for reciprocation in a valve guide, said portions of the stem providing in association with one another a chamber open at one end.

6. A poppet valve for reciprocation in an internal combustion engine valve guide comprising an enlarged head, an elongated concentric stem, a skirt secured to the stem in encompassing relationship reciprocable in the valve guide, and means in the peripheral surface of the skirt for scraping carbon deposits from the valve guide and for inhibiting seepage of fluid past the top of the valve guide.

CARL VOORHIES.

REFERENCES CITED

The following references are of record in the file of this patent:

UNITED STATES PATENTS

| Number | Name | Date |
|---|---|---|
| 1,312,730 | Horn | Aug. 12, 1919 |
| 1,578,191 | Devos et al. | Mar. 23, 1926 |
| 1,873,569 | Ford | Aug. 23, 1932 |
| 2,153,384 | Steiner | Aug. 4, 1939 |
| 2,238,628 | Daisley | Apr. 15, 1941 |
| 2,316,488 | Roth | Apr. 13, 1943 |

FOREIGN PATENTS

| Number | Country | Date |
|---|---|---|
| 17,201 | British | July 27, 1911 |
| 2,964 | British | Feb. 7, 1903 |